United States Patent [19]

Murphy et al.

[11] Patent Number: 5,339,374
[45] Date of Patent: * Aug. 16, 1994

[54] FUSED BICONICAL TAPER FIBER OPTIC COUPLER STATION AND FABRICATION TECHNIQUES

[75] Inventors: Kent A. Murphy, Roanoke; Michael F. Gunther, Blacksburg; Richard O. Claus, Christiansburg, all of Va.

[73] Assignees: The Center for Innovative Technology, Herndon; Virginia Polytechnic Institute & State University; Virginia Tech Intellectual Properties, Inc., both of Blacksburg, all of Va.

[*] Notice: The portion of the term of this patent subsequent to Jun. 1, 2010 has been disclaimed.

[21] Appl. No.: 67,868

[22] Filed: May 26, 1993

Related U.S. Application Data

[63] Continuation-in-part of Ser. No. 777,669, Oct. 15, 1991, Pat. No. 5,216,731.

[51] Int. Cl.5 .............................. G02B 6/00; G02B 6/36
[52] U.S. Cl. ........................................................ 385/43
[58] Field of Search .................................... 385/41–45

[56] References Cited

U.S. PATENT DOCUMENTS

| | | | |
|---|---|---|---|
| 4,054,366 | 10/1977 | Barnoski et al. | 385/42 |
| 4,291,940 | 9/1981 | Kawasaki et al. | 385/43 |
| 4,400,055 | 8/1983 | Ozeki et al. | 385/43 |
| 4,426,215 | 1/1984 | Murphy | 65/4.21 |
| 4,449,781 | 5/1984 | Lightstone et al. | 385/43 |
| 4,550,974 | 11/1985 | Murphy | 385/43 |
| 4,763,977 | 8/1988 | Kawasaki et al. | 385/43 |
| 4,801,185 | 1/1989 | Bricheno | 385/43 X |
| 5,011,252 | 4/1991 | Thorncraft et al. | 385/43 X |
| 5,046,804 | 9/1991 | Fukuma et al. | 385/43 |
| 5,216,731 | 6/1993 | Murphy et al. | 385/43 |

*Primary Examiner*—Akm E. Ullah
*Attorney, Agent, or Firm*—Whitham, Curtis & Whitham

[57] ABSTRACT

The fibers are bound together about 1 cm apart. An oxy-propane torch is used to heat the fibers so that they fuse together. At the same time, the two relatively movable translational stages to which the fibers are clamped are pulled apart to form a biconical tapered region in the fibers. The fibers are tapered until a desired coupling ratio is achieved. After the insertion loss is measured, the torch is reintroduced into the taper region and one side (e.g., the right side) of the taper region is rotated with a minimal increase in the taper length, i.e., the distance between the two stations is increased only enough to keep an even tension in the taper region.

9 Claims, 5 Drawing Sheets

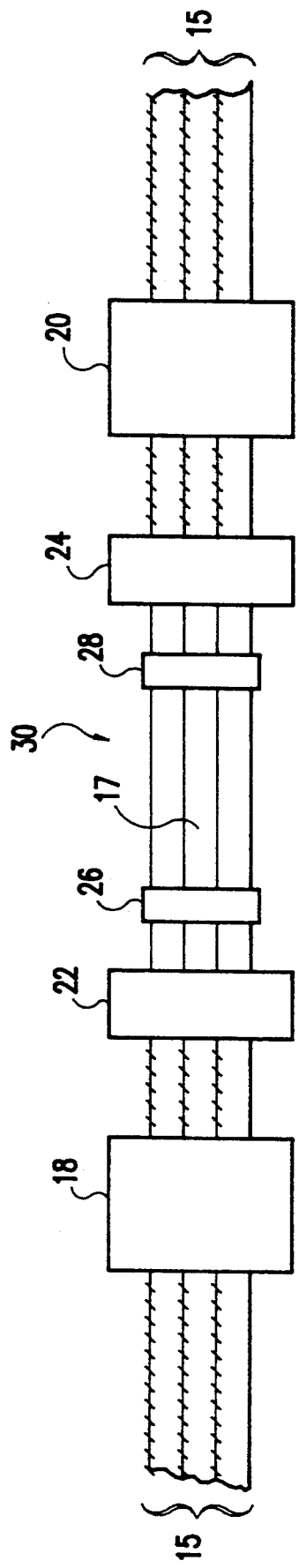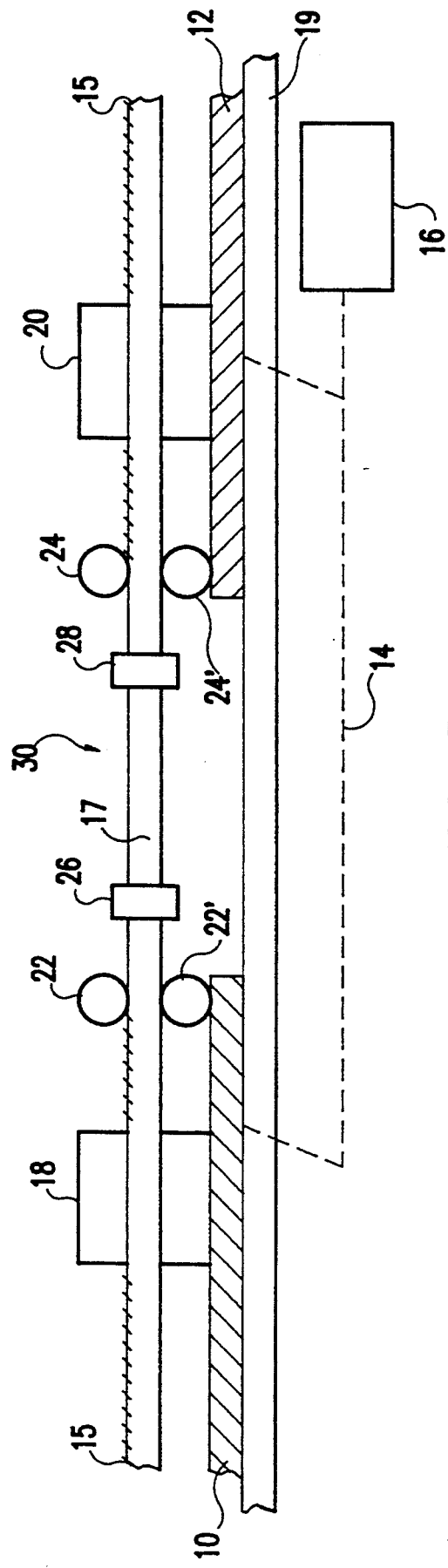

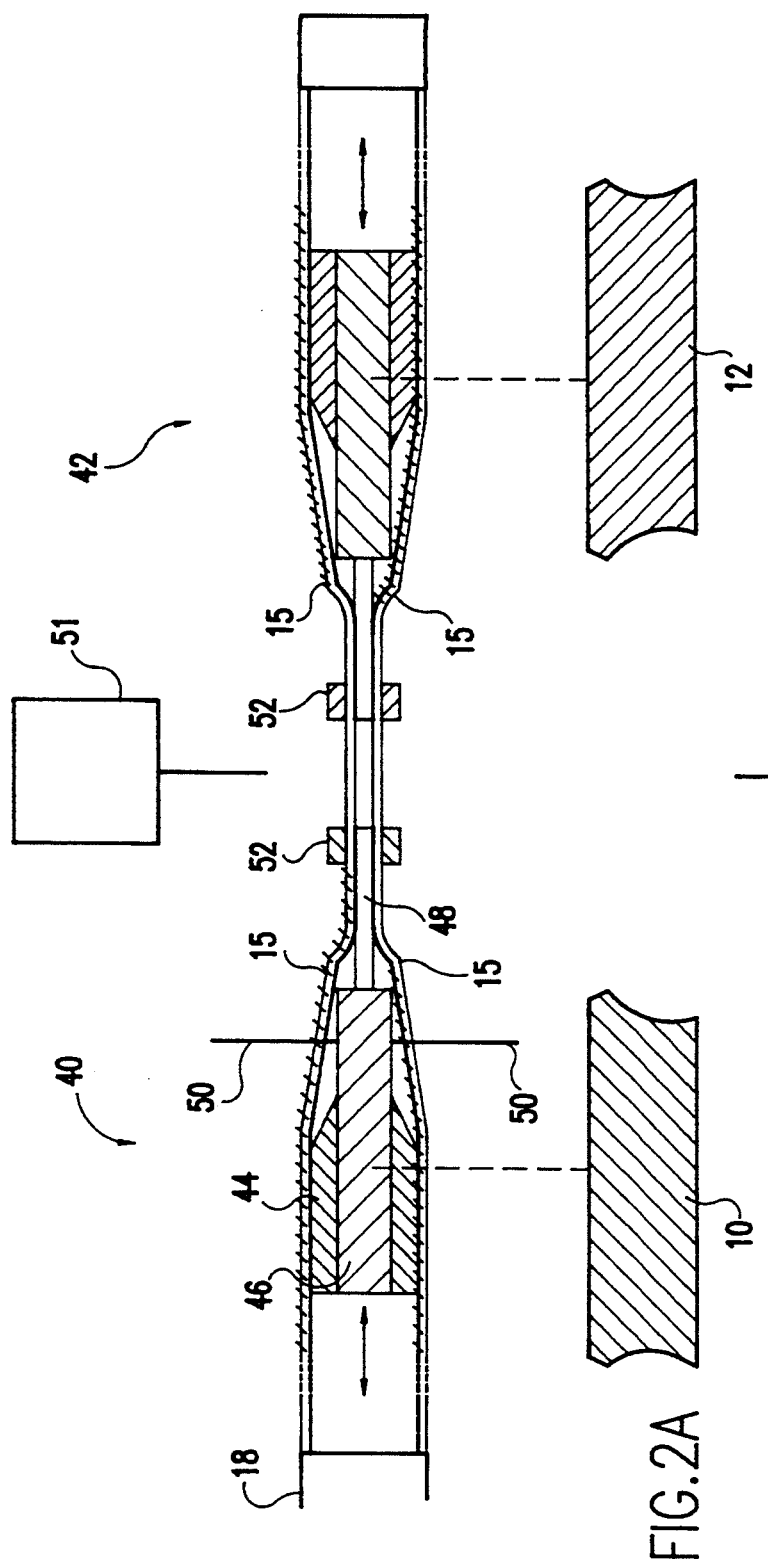
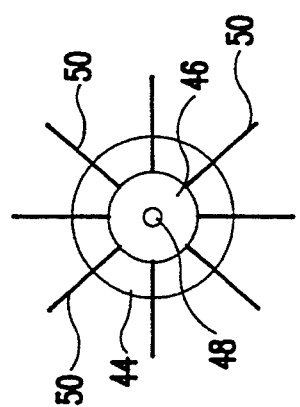
FIG.2A
FIG.2B

|  | Input-injectors | |
|---|---|---|
| Output-detectors | 1 | 2 |
| 9 | 8.5 | 10.1 |
| 10 | 9.9 | 7.8 |
| 11 | 10.3 | 9.9 |
| 12 | 9.8 | 10.1 |
| 13 | 10.0 | 9.8 |
| 14 | 10.6 | 10.5 |
| 15 | 9.9 | 9.8 |
| 16 | 10.1 | 10.2 |

Insertion loss (dB) BEFORE

Total uniformity = 2.8 dB (10.6 − 7.8)

FIG.4A

|  | Input-injectors | |
|---|---|---|
| Output-detectors | 1 | 2 |
| 9 | 9.9 | 10.0 |
| 10 | 10.7 | 10.4 |
| 11 | 10.6 | 10.2 |
| 12 | 9.8 | 10.3 |
| 13 | 10.1 | 10.5 |
| 14 | 10.6 | 9.9 |
| 15 | 10.2 | 10.5 |
| 16 | 10.0 | 10.8 |

Insertion loss (dB) AFTER

Total uniformity = 1.0 dB (10.8 − 9.8)

FIG.4B

FUSED BICONICAL TAPER FIBER OPTIC COUPLER STATION AND FABRICATION TECHNIQUES

DESCRIPTION

This application is a continuation-in-part of application Ser. No. 07/777,669, filed Oct. 15, 1991 now U.S. Pat. No 5,216,731, which is incorporated herein by reference.

BACKGROUND OF THE INVENTION

1. Field of the Invention

The present invention generally relates to fiber optic couplers and, more particularly, to biconical-taper couplers and apparatus for the manufacture of such biconical-taper couplers.

2. Description of the Prior Art

Biconical-taper fiber optic couplers are well known in the art. The performance of a coupler is judged principally by the criteria of uniformity of distribution from the input fiber to the output fibers and the overall loss through the coupler. When measuring the uniformity of a fused biconical taper coupler during fabrication, the limiting factor is the extra output power in the fiber that is injected. The extra power comes from low order modes that are not coupled out of the injection fiber through the down taper. Only high order modes are transferred to the cladding in the minimum taper region. The up-taper redistributes the optical power among all of the fibers in the coupler. The low order modes can be redistributed by deforming the cores to produce a mixing region. A widely used method in use today to produce biconical couplers involves heating them in a region where they are bunched or twisted with the heated region in longitudinal tension. The following U.S. patents disclose various embodiments of such methods for forming biconical fiber optic couplers.

U.S. Pat. No. 4,426,215 to Murphy, discloses twisting fibers together, heating and then tapering to a minimum taper region (MTR). To improve uniformity of the coupler outposts, the MTR is deformed, either by scoring and breaking the MTR, or by pushing the MTR while heating to form a ball. Scoring takes place at the MTR and here the coupler is broken by pulling on opposite sides of the scored MTR. The ends of the two-pieces are then heated and pushed together to permanently rejoin the two regions.

U.S. Pat. No. 4,550,974 to Murphy, discloses low loss fused biconical taper fiber optic coupler that has a biconical taper region where the fibers are fused together. The MTR is deformed. The core material in the deformed region is scrambled with the cladding material as a result of the deformation process so that lower order modes are forced into the claddy.

U.S. Pat. No. 4,291,940 to Kawasaki et al. discloses a low loss access coupler including two multimode optic fibers, each having a biconical taper section. The biconical taper sections of the fibers are fused together to provide optical coupling between the fibers. The fused fibers may also be twisted around one another to enhance mode mixing. The access couplers may be produced by fusing two fibers together along a small length, then heating the fused length and pulling the fibers to form the biconical tapers; or by twisting a portion of each of the fibers around one another, applying a tensile force to the twisted portions of the fibers and heating a region of the twisted fibers to soften and fuse a predetermined length of twisted fibers. If the fibers already have biconical taper sections, the access coupler may be produced by twisting the fibers together along their taper sections and heating a region of the taper sections to fuse them together.

U.S. Pat. No. 4,449,781 to Lightstone et al., discloses an optical fiber coupler for operatively 10 coupling together two or more optical fibers. Each coupler consists of several biconically tapered fibers. The biconical sections of each fiber are placed side by side or twisted around one another, and fused together.

As those skilled in the art will appreciate, couplers in which core material is scrambled with the cladding provides an improved output uniformity, yet they are not altogether satisfactory in terms of uniformity of output distribution and low loss.

As also will be appreciated by those skilled in the art, in forming a biconical fiber optic coupler, the insulating jacket (typically a polymer) must be removed from the optic fibers in the region where the coupler is formed. After the coupler is formed, to mechanically support and mechanically stabilize the coupler, a stainless steel strip is epoxyed to the bare fibers and jacketed fibers on either side of the taper region. With prior apparatus for forming biconical-taper couplers, the fibers must be released and reclamped after the coupler is formed in order to secure the stabilizer strip; a time consuming operation.

SUMMARY OF THE INVENTION

It is therefore an object of the present invention to provide an optic fiber coupler fabrication station that allows one-step packaging and reduces fabrication time.

Another object of the invention is a coupler with improved uniformity of output distribution and low loss; a coupler in which the fiber cores material are not scrambled with fiber cladding matter.

Briefly, this invention contemplates the provision of a biconical fiber optic coupler that does not twist together the fibers to be coupled prior to forming the coupler and further contemplates a fixture for fabricating biconical couplers that allows a stabilizing strip to be epoxyed to the coupler and the jacketed fibers in one step.

The fixture has two locations on each side of the region where the biconical-taper coupler is to be formed. A clamp at the first location clamps jacketed fibers; a removable support at the second location supports the unjacketed fibers. The unjacketed fibers on either side of the coupler region are held in contact with one another by means bands such as cotton thread wrapped around the bundle, or preferably by means of a shape-memory alloy metal such as Nitinol. The biconical-taper coupler is formed by heating the unjacketed fibers suspended between the aligned removable supports while the clamps urge the fibers in opposite directions. After the coupler is formed, the supports are removed and an Invar stabilizer is epoxyed to the jacketed fibers on either side of the coupler and to the coupler itself.

In one embodiment of the invention, the fibers are bound together about 1 cm apart. An oxy-propane torch is used to heat the fibers so that they fuse together. At the same time, the two relatively movable translational stages to which the fibers are clamped are pulled apart to form a biconical tapered region in the fibers. The fibers are tapered until a desired coupling ratio is achieved. After the insertion loss is measured, the torch is reintroduced into the taper region and one side (e.g., the right side) of the taper region is rotated with a minimal increase in the taper length, i.e., the distance between the two stations is increased only enough to keep an even tension in the taper region.

BRIEF DESCRIPTION OF THE DRAWINGS

The foregoing and other objects, aspects and advantages will be better understood from the following detailed description of a preferred embodiment of the invention with reference to the drawings, in which:

FIGS. 1A and 1B are schematic diagrams of an apparatus for manufacture of biconical couplers in accordance with the teachings of this invention a support in this embodiment can accommodate on the order of eight fibers; FIG. 1A is a schematic top plan view, and FIG. 1B is a schematic side elevation view.

FIG. 2A is a side elevation, with parts in section, of supports adapted to accommodate the manufacture of couplers comprised of more than eight fibers; FIG. 2B is an end view of the support.

FIGS. 4A and 4B show two tables, respectively, of insertion loss of an 8×8 star coupler before and after a heat and twist step in accordance with the teachings of this invention.

DETAILED DESCRIPTION OF A PREFERRED EMBODIMENT OF THE INVENTION

Figure 3A:
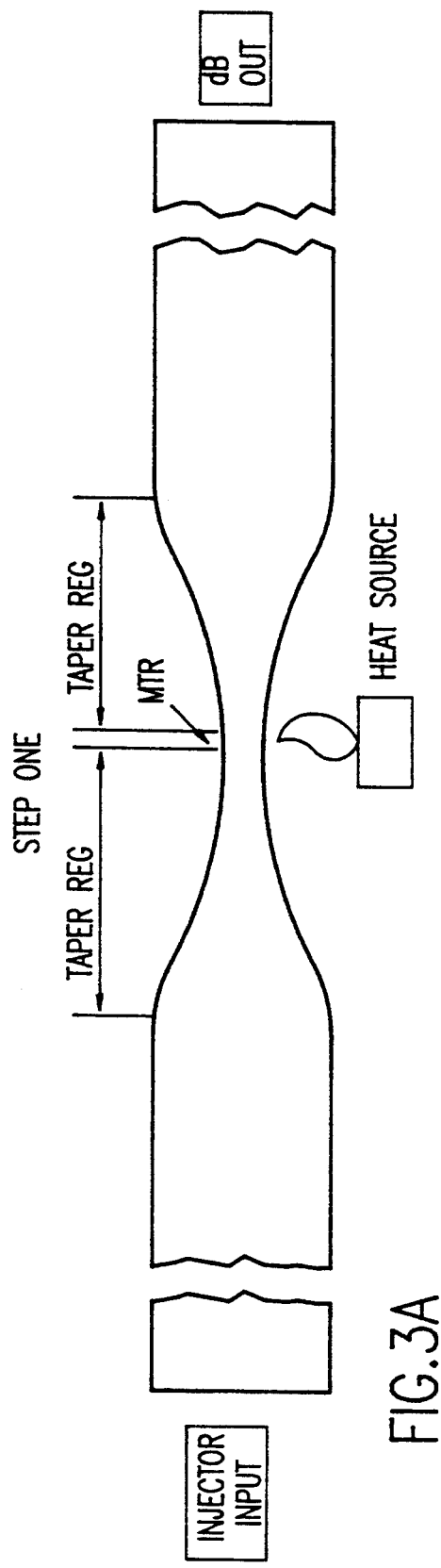
FIGS. 3A and 3B illustrate the process steps for forming a coupler in accordance with one embodiment of the invention.

Referring now to the drawings, and more particularly to FIGS. 1A and 1B, a coupler manufacturing apparatus in accordance with this invention has two linear translation stages 10 and 12 that are driven in opposing directions using, for example, left-hand and right-hand threaded rods, indicated schematically as the dotted line 14. A small electric motor 16 drives the rods. A support 19, like an optical bench, supports the entire assembly with components in alignment.

A pair of clamps 18 and 20, secured respectively to stages 10 and 12, clamp fibers 15 (3 fibers in this illustrative embodiment) in a region where the fibers are jacketed. The jacketed region of the fibers is indicated by the short hash marks in the drawing. Typically, the clamps 18 and 20 are about 2 meters apart. A pair of bars 22 and 22' secured to station 10 support the unjacketed bare fibers on the left-hand side of a central region 17 where the coupler is to be formed. A corresponding aligned pair of bars 24 and 24' secured to station 12 support the unjacketed bare fibers on the righthand side of the region. The supports 22-22' and 24-24' are typically spaced apart about 4 centimeters and preferably both sets of bars 22 or 24 is adjustably mounted with respect to the stage to which it is secured.

The clamps 18 and 20 exert a necessary force to place the central region 17 in tension during the tapering process with the bare fibers supported in a precisely horizontal position by the bar pairs 22-22' and 24-24'. Bands 26 and 28 bundle together the fibers on opposite sides of the region to be tapered; the bands are spaced apart about 1 centimeter. The bands 26 and 28 may be cotton thread, or preferably a shape-memory alloy such as Nitinol so the pressure exerted on the fiber bundle can be regulated by controlling a current coupled to the shape-memory alloy.

An oxy-propane torch, indicated schematically by the reference numeral 30, is used to fuse the fibers together while simultaneously the two translation stages 10 and 12 pull the fibers to form a biconical tapered region in the fibers. The fibers are tapered until the desired coupling ratios are achieved; in this step one fiber is injected with light, and the optical power in the fibers on the opposite side of the coupler are continuously monitored during the tapering process. The bar support pairs 22-22' and 24-24' shown in this FIG. 1 can accommodate two to eight fibers.

When the coupler is complete, bar pairs 22-22' and 24-24' used to support the bare fibers are removed, to allow a stabilizing strip (such as Invar) to be epoxyed to the coupler and to the jacketed fibers. An Invar strip (for four fibers or less) or "V"-shaped structure (for more than four fibers) is raised using a micropositioner to within a few microns of the coupler. Epoxy is used to attach the coupler to the Invar. A strip (used for four or less coupled fibers) is epoxyed to the bare fibers and to the jacketed fibers on either side of the taper region.

The coupler supports 22-22' and 24-24' shown in FIGS. 1A and 1B can accommodate two to eight fibers. While performing well in coupling up to eight optic fibers, there are applications which require the coupling of a larger plurality of optic fibers. FIG. 2 illustrates a bare fiber support that can be used in place of rod pairs 22-22' and 24-24' to accommodate up to 100 fibers.

As shown in FIGS. 2A and 2B, opposing identical supports indicated by the general reference numerals 40 and 42 are used to support the jacketed fibers. FIG. 2B illustrates a sectional view of either support. Each support comprises an outer mandrel 44 carrying an inner movable rod 46. A stainless steel tube 48 (or other suitable support such as a stainless steel needle) extends from the front of the rod 46. Fiber separators 50 extend radially outwardly from the rod 46 and facilitate the even distribution of the fibers around mandrel 44. Fibers to be coupled are distributed around the periphery of the supports 40 and 42, with the jacket removed from a fiber starting where the fiber leaves support tube 48. Cotton thread or shape-memory alloy bands 52 are used to hold the fibers in tight bundles while they are fused by a torch 51 and a taper is formed by driving stages 10 and 12 in opposite directions as previously explained. Two bands are used on either side of the coupler. After the coupler has been formed, bands 52 are removed. The coupler can be stabilized by raising a "V"-shaped Invar structure to within a few microns of the coupler and attached with epoxy. An epoxy with a fast cure time such as Devcon 5-minute is used to form a dam on both side of the taper region to prevent the more durable heat-cure epoxy from wicking onto the taper region. It will be appreciated, any material, with a higher index-of-refraction than the coupler, will cause excess loss in the coupler if it comes in contact with the taper region. The movable bar 46 is then retracted, removing the support 48. It will be appreciated that one or both of the supports 40 and/or 42 are preferably rotatably mounted with respect to the stages 10 and 12.

After tapering alone the maximum power is always in the throughput fiber (1 through N+1 or 2 through N+2). The lower order modes are still guided by the tapered fibers while the higher order modes are coupled to the cladding in the down taper. The power in the cladding is evenly distributed in all fibers on the up taper except for the throughput fiber which has a higher power due to the lower order modes that were never coupled to the cladding region. Some modification of the taper region is necessary to achieve a uniformity factor that is dependent upon factors other than the throughput fiber insertion loss. A modification technique in accordance with the teachings of this invention will be described in connection with FIGS. 3 and 4.

Referring now to FIGS. 3A, 3B, 4A, and 4B of the drawings, in step one of the process (FIG. 3A), optical fibers are loaded onto the fabrication station and are fused together to form a fused, unitary, unscrambled taper, using for example the apparatus and steps previously described in connection with FIGS. 1 and 2. With the taper formed, as illustrated in FIG. 3A, the insertion loss is measured. FIG. 4A represents typical insertion loss values, measured in terms of dB, between input injected at fibers 1 and 2 and output-detectors at fibers 9–16 for an 8×8 star coupler.

Figure 3B:
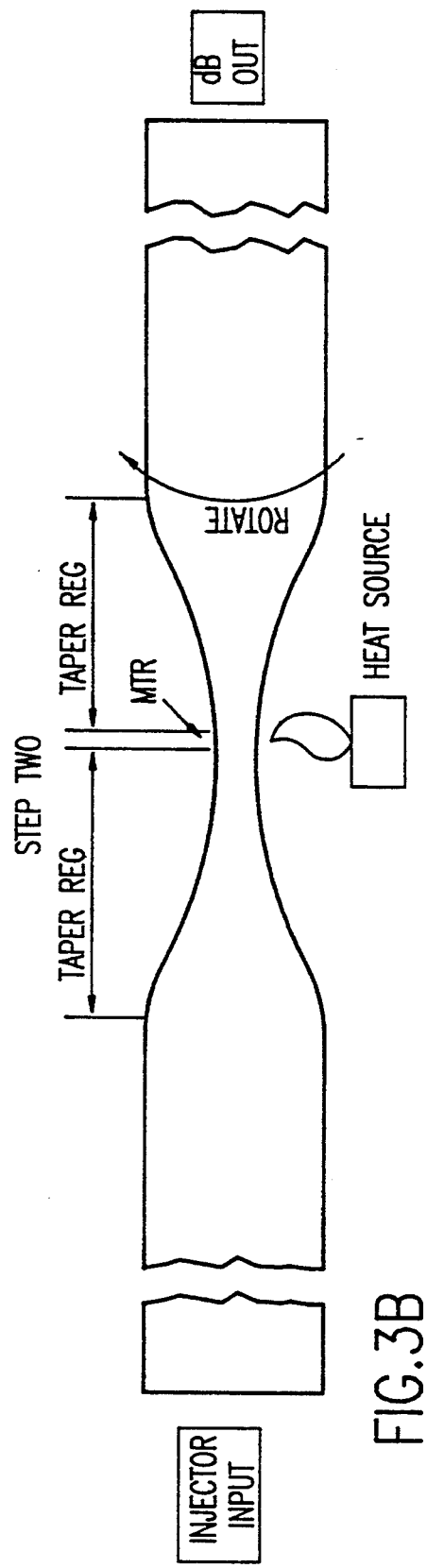

Applicants have discovered that the uniformity of insertion loss among the outputs of the fibers in the coupler can be improved by the following step, illustrated in FIG. 3B. The taper region is reheated by means of a torch or other suitable heater to a temperature where there is again a softening of the fibers in the taper region (e.g., to a temperature of about 1300° C.). With the fibers in the taper region in a softened state, one side of the taper region (illustrated here as the right side) is rotated relative to the side. The distance between the two stations 10 and 12 is increased a minimum amount during this heating and twisting operation only enough to maintain a constant tension in the taper region, thereby minimizing any increase in length in the taper region.

The amount of rotation is determined by injecting the same input fibers and monitoring the insertion loss at the same fiber outputs as were injected and monitored before the heating and rotation step. Typically, the relative rotation is on the order of 270°. The rotation process can continue so long as the loss uniformity continues to improve. FIG. 4B shows the comparable insertion losses for the same 8×8 star coupler shown in FIG. 4A, but after one side of the taper region has been rotated. These improvements in uniformity can be seen by comparing this before-and-after data. It will be noted also from a comparison of FIGS. 4A and 4B that there is an overall increase in insertion loss in FIG. 4B as compared with FIG. 4A. However, this increase in loss is of negligible significance when compared to the improvement in uniformity.

Figure 5:
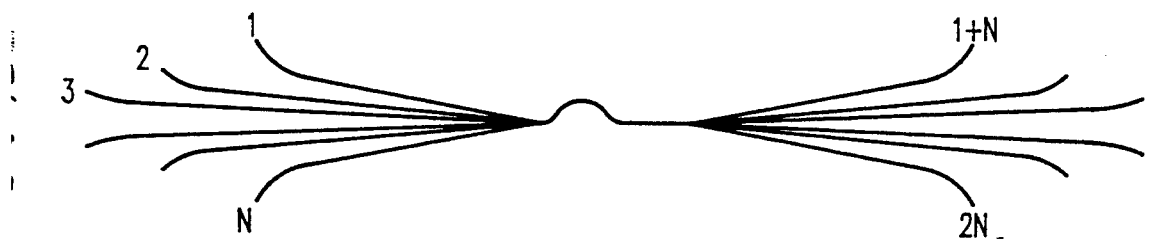
FIGS. 5, 6 and 7 illustrate alternate embodiments of the invention.

Referring now to FIG. 5, here the "twisted" minimum taper region formed in accordance with FIGS. 3A and 3B is heated and pushed to form a "U"-shape band 60. The sharp bend causes the low order modes to couple into the cladding. This method improves uniformity but causes some problems with coupler performance under vibration. The nonsymmetric nature of the coupler (a relatively large mass to one side of the coupler) makes the coupler susceptible to break at resonant mechanical frequencies.

Figure 6:
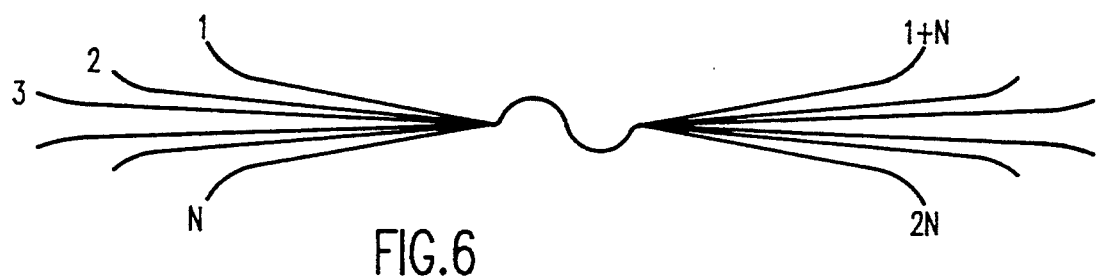

Referring now to FIG. 6, here bends similar to FIG. 5 are smaller and form an "S" shape; a geometry that reduces the vibration problems.

Figure 7:
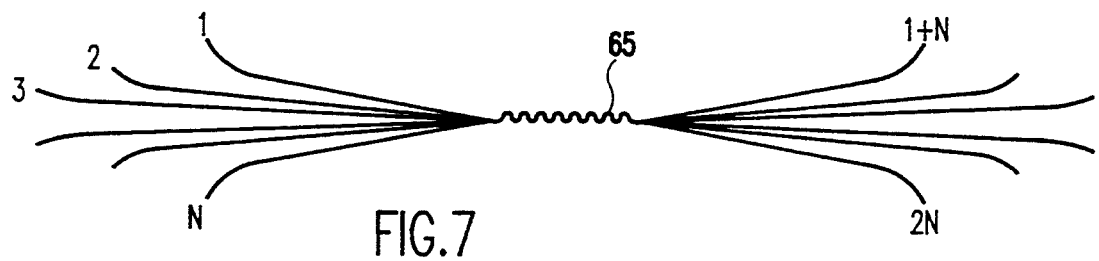

As illustrated in FIG. 7, small "microbends" 65 can be formed in the minimum taper region. The periodic nature of the microbends in the minimum taper region couple low order modes into the cladding to improve uniformity. The microbends can be individually created with a torch while pushing the coupler together or, they can be created using a heated frond.

Having thus described our invention, what we claim as new and desire to secure by Letters Patent is as follows:

1. A biconical-taper coupler for distributing higher order modes and lower order modes in an input fiber uniformly to a plurality of output fibers, said plurality of output fibers including said input fiber, said coupler comprising a unitary unscrambled biconical-taper region including a first tapered region, a second tapered region and a minimum tapered region between said first tapered region and said second tapered region, said first tapered region being rotated with respect to said second tapered region.

2. A biconical-taper coupler for distributing higher order modes and lower order modes in an input fiber uniformly to a plurality of output fibers as in claim 1, wherein said first tapered region is rotated on the order of 270° with respect to said second tapered region.

3. A biconical-taper coupler for distributing higher order modes and lower order modes in an input fiber uniformly to a plurality of output fibers as in claim 1, further including a "U"-shaped bend in said minimum tapered region.

4. A biconical-taper coupler for distributing higher order modes and lower order modes in an input fiber uniformly to a plurality of output fibers as in claim 1, further including a "S"-shaped bend in said minimum tapered region.

5. A biconical-taper coupler for distributing higher order modes and lower order modes in an input fiber uniformly to a plurality of output fibers as in claim 1, further including a plurality of microbends in said minimum tapered region.

6. A biconical-taper coupler for distributing higher order modes and lower order modes in an input fiber uniformly to a plurality of output fibers as in claim 1, wherein said first tapered region is rotated with respect to said second tapered region through an angle over which insertion loss uniformity in said plurality of output fibers improves.

7. A method of forming a biconical-taper coupler for distributing higher order modes and lower order modes in an input fiber uniformly to a plurality of output fibers, said plurality of output fibers including said input fiber, said method comprising the steps of:

forming a unitary unscrambled biconical-taper region including a first tapered region, a second tapered region and a minimum tapered region between said first tapered and said second tapered region;

heating said unitary unscrambled biconical-tapered region to soften said unitary unscrambled biconical-tapered region; and rotating said first tapered region relatively to said second tapered region while unitary unscrambled biconical-tapered region is in a softened state.

8. A method of forming a biconical-taper coupler for distributing higher order modes and lower order modes in an input fiber uniformly to a plurality of output fibers as in claim 7, wherein said rotating step rotates said first tapered region relatively to said second tapered region on the order of 270°.

9. A method of forming a biconical-taper couple for distributing higher order modes and lower order modes in an input fiber uniformly to a plurality of output fibers, said plurality of output fibers including said input fiber, said method comprising the steps of:

forming a unitary unscrambled biconical-taper region including a first tapered region, a second tapered region and a minimum tapered region between said first tapered and said second tapered region;

heating said unitary unscrambled biconical-taper region to soften said unitary unscrambled biconical-taper region;

rotating said first tapered region relatively to said second tapered region while unitary unscrambled biconical-taper region is in a softened state;

in conjunction with said rotating step, injecting said input fiber and determining the uniformity of insertion loss in said plurality of output fibers; and continuing said rotating step so long as the uniformity of insertion loss in said output fibers improves.

* * * * *